H. C. H. LERCH.
FLIER SPINNING AND TWISTING MACHINE.
APPLICATION FILED JULY 14, 1913.
1,124,476.
Patented Jan. 12, 1915.
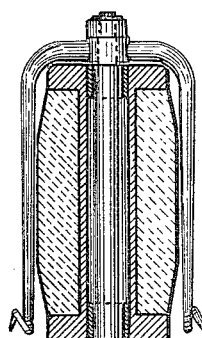
Fig. 1.
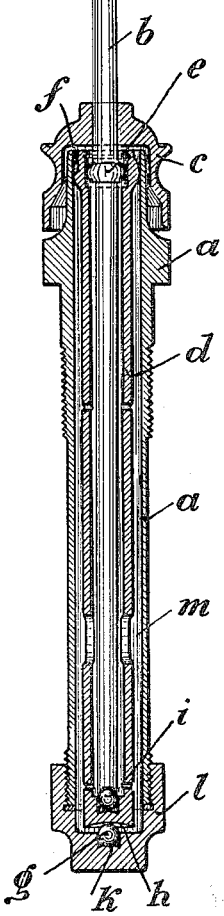
Fig. 2.
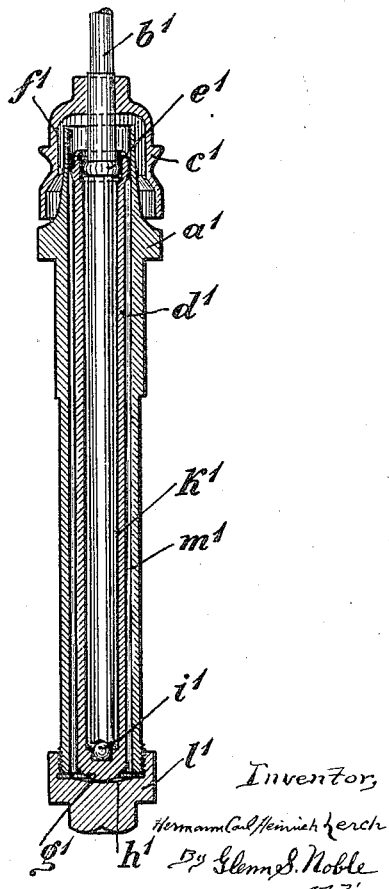
Witnesses:
Inventor,
Hermann Carl Heinrich Lerch
By Glenn S. Noble
Att'y.

UNITED STATES PATENT OFFICE.

HERMANN CARL HEINRICH LERCH, OF AMERIKA-ON-THE-MULDE, GERMANY.

FLIER SPINNING AND TWISTING MACHINE.

1,124,476.

Specification of Letters Patent.

Patented Jan. 12, 1915.

Application filed July 14, 1913. Serial No. 778,840.

*To all whom it may concern:*

Be it known that I, HERMANN CARL HEINRICH LERCH, a citizen of the German Empire, residing at Amerika-on-the-Mulde, in the Kingdom of Saxony, Germany, have invented certain new and useful Improvements in Flier Spinning and Twisting Machines; and I do hereby declare the following to be a full, clear, and exact description of the invention, such as will enable others skilled in the art to which it appertains to make and use the same.

My invention relates to improvements in flier spinning and twisting machines, and more particularly to the construction of the bearings of the flier spindles of such machines.

I have found that the bearings for the spindles on machines heretofore used have had various objectionable features, and the present invention is intended to overcome such objections as fully as possible.

The present invention has now for its object to provide an improved flier spindle bearing of the most simple construction possible, and which will work in an absolutely and permanently reliable manner at all speeds.

The invention consists substantially in providing a double bearing casing of known construction in which the inner sleeve that receives the spindle and that is made spherical in the usual manner in the plane of engagement of the driving cord, is caused to bear in a movable manner with its hollow spherical base likewise upon a sphere arranged in the outer bearing casing.

This invention is illustrated by way of example in the accompanying drawings in which:—

Figures 1 and 2 are longitudinal sections of two modifications of the improved spindle bearing.

As shown, $a$ is the fixed bearing sleeve adapted to be screwed into the spindle rail, $b$ is the spindle composed in the usual manner of a steel body carrying on its unsupported cylindrical upper part in addition to the driving whirl $c$ of the flier and the bobbin.

The middle portion of the spindle $b$ is provided with a rounded collar $e$ working in an enlarged part $f$ of the bore of the inner sleeve $d$. The ball $i$ forms the footstep bearing for the spindle $b$. The inner sleeve $d$ is bulged at its bottom which serves as a bearing for the ball $i$. The hollow spherical foot of the inner sleeve $d$ bears upon a ball $g$ which in its turn bears upon a convex surface $k$ of the bottom cap $l$ of the outer sleeve $a$.

In the improved bearing the spindle is therefore no longer mounted directly in the fixed bearing sleeve $a$, but is mounted indirectly in a sleeve $d$ which in its turn, owing to its bearing upon a ball, allows the spindle to rock freely even when the outer sleeve $a$ should not be in an exactly vertical position or be screwed askew into the spindle rail.

A further modification is shown in Fig. 2. Now according to this second modification, the base of the inner bearing sleeve is made spherical and the bottom of the outer bearing casing is made spherically concave. $a^1$ is the fixed bearing sleeve which is screwed into the spindle rail, and $b^1$ is the spindle which consists in the usual manner of a steel body carrying on its unsupported cylindrical upper part, in addition to the driving whirl $c^1$, the flier and the bobbin. The middle part of the spindle $b^1$ is provided with a rounded collar $e^1$ which works against the enlarged portion $f^1$ of the bore of the inner sleeve $d^1$. The ball $i^1$ constitutes the footstep bearing for the spindle $b^1$. The inner sleeve $d^1$ has a rounded base $g^1$. The lower end of the outer bearing sleeve $l^1$ is also made spherically hollow. The center of the radius of curvature is situated in the plane of engagement of the driving cord, while the center of the radius of curvature of the rounded base $g^1$ is situated considerably lower. The spindle is therefore no longer mounted directly in the fixed bearing sleeve $a^1$, but indirectly in a sleeve $d^1$ which has a rounded base that rests upon the correspondingly spherically concave surface $h$ of the lower part $l^1$ of the bearing casing with a tendency to automatically center itself.

While in describing the invention reference has been made to particular embodiments thereof, I wish it to be understood, that my invention is not limited to the examples shown in the drawings, and that various changes may be made in the construction of the elements shown in the drawing. The invention may also be applied to ring spindles, in which case both examples give good results.

I claim herein as my invention:

1. A bearing for spindles, comprising an outer sleeve having a hollow spherical bottom, an inner sleeve having a spherical base resting on said bottom sleeve, said inner sleeve being smaller than the opening in the outer sleeve, the arrangement being such that the center of the radius of curvature of the spherical cavity in the outer sleeve is situated in the plane of engagement of the driving cord and the radius of the spherical base is shorter than the radius of the cavity.

2. In flier spinning and twisting machines, the combination with the spindle, and driving means therefor, of an element providing a rotary support for the spindle, and a member supporting said element, said element being adapted to rock relatively to said member about a point which is located within the plane in which said driving means act, said element and member being formed at the end of the element respectively with spherical concave and convex step bearing surfaces, the center of curvature of the concave bearing surface formed on the member coinciding with the point about which said element is adapted to rock and the center of curvature of the convex bearing surface formed on the element being located below the said point.

HERMANN CARL HEINRICH LERCH.

Witnesses:
EMIL F. SAGER,
WALTER KOHLER.

Copies of this patent may be obtained for five cents each, by addressing the "Commissioner of Patents, Washington, D. C."